United States Patent Office 3,554,811
Patented Jan. 12, 1971

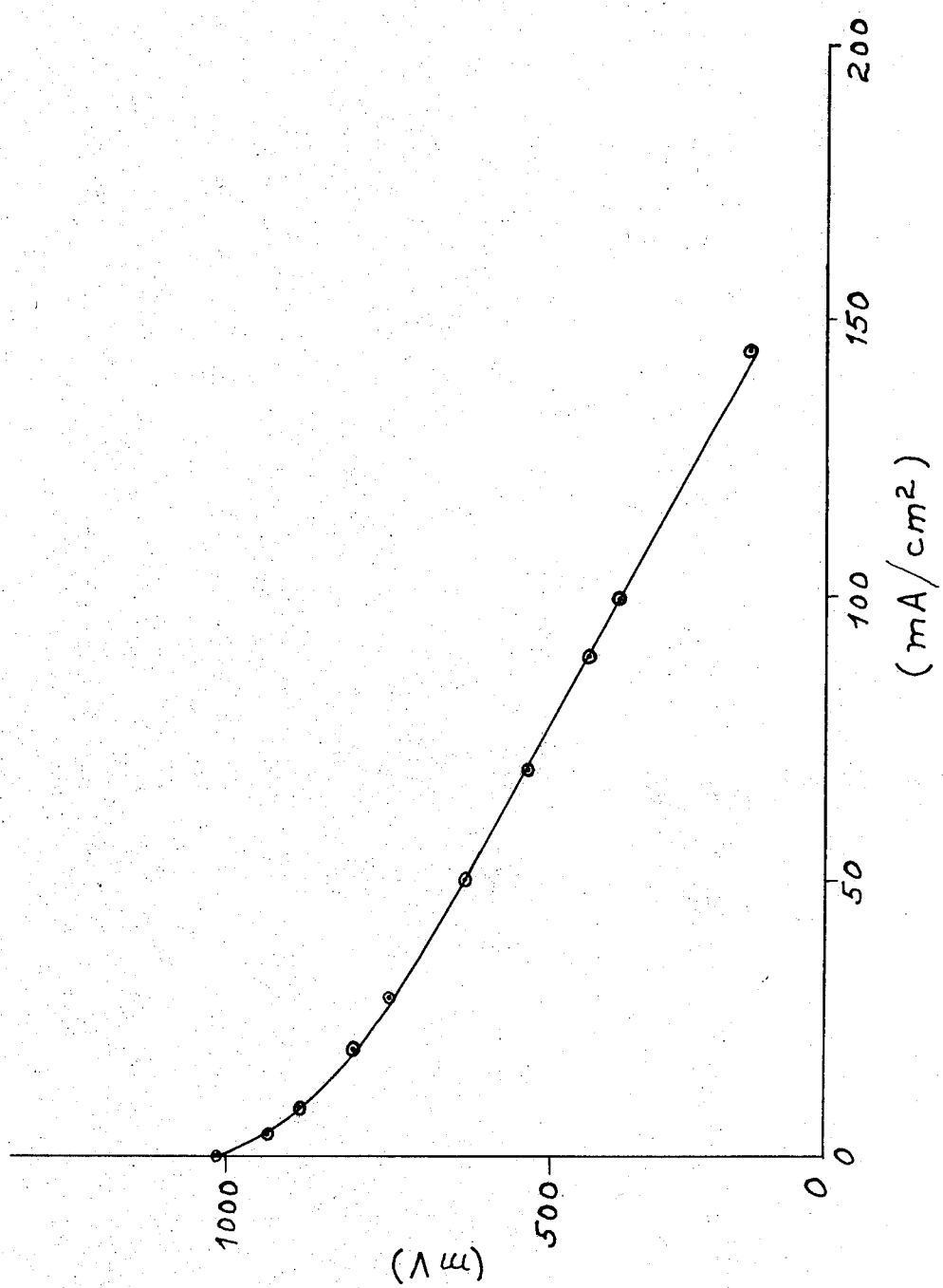

3,554,811
OXIDE CATHODE MATERIAL FOR PRIMARY
FUEL CELLS FOR HIGH TEMPERATURES
Arnold Isenberg, Neu-Isenburg, and Wilfried Pabst and Gerd Sandstede, Frankfurt am Main, Germany, assignors to Aktiengesellschaft Brown, Boveri & Cie., Baden, Switzerland, a joint-stock company
Filed Oct. 9, 1967, Ser. No. 673,557
Claims priority, application Germany, Oct. 22, 1966, B 89,522
Int. Cl. H01m 27/04, 27/16
U.S. Cl. 136—120
2 Claims

ABSTRACT OF THE DISCLOSURE

An oxide cathode material for primary fuel cells with oxygen-ion-conducting mixed-oxide solid electrolytes working at high temperatures with gaseous oxidants. The material consists of indium oxide doped with gallium oxide and/or zinc oxide, and the quantity of these latter two oxides in the indium oxide is between 0 and 30% by weight.

---

The present invention relates to oxide cathode material for primary fuel cells with oxygen-ion-conducting solid electrolytes which are operated at high temperatures with gases as the fuel and the oxidant.

It is known that the oxidant, for example oxygen, undergoes electrochemical reduction on the cathodes of primary fuel cells. The cathodes must therefore be in good contact with the electrolyte. In the case of liquid and fusible electrolytes, the electrodes are wetted by the electrolyte, but on the contrary the electrodes must exhibit good mechanical adhesion in the case of solid electrolyte. The output density of these cathodes depends on the area of adhesion. Accordingly, they must not corrode. Cathode materials have hitherto taken the form of platinum (H. Binder et al., Elektrochemica 8, 781, 1963; D. H. Archer et al., "Solid Electrolyte Batteries," 18th Annual Proceedings Power Sources Conference, May 19–21, 1964) or silver (U.S. patent specifications 3,138,487 and 3,138,490) as well as oxides of the metals manganese, copper, cobalt and nickel (South African patent specification 632,676) and cubic mixed oxides of zirconium oxide with praseodymium oxide or zirconium oxide with cerium oxide (German patent specification 22,030).

These known cathode materials have the following disadvantages:

Electrodes made of platinum metals are too expensive. Silver evaporates noticeably at temperatures of more than 900° C., so that thinly coated cathodes are destroyed. If liquid silver cathodes are used, narrow limits are imposed on the cell structure for constructional reasons (beaker-shape, gravity-dependence, space requirement). Cathodes made of the said metallic oxides have so high an electrical resistance that they are practically unusable without a metallic collector made of silver or other precious metals, and here regard must again be had to the fact that silver evaporates and other precious metals are too expensive as collectors.

The problem of the invention resides in providing a cathode material which—without exhibiting the disadvantages of hitherto known cathodes for primary fuel cells with solid electrolytes—is corrosion-resistant and has relatively high conductivity, without there being any need to use a precious metal in producing the cathodes.

It has now been found that when using metallic oxides the disadvantages of hitherto known cathode materials may be avoided if indium oxide improved with relatively small quantities of gallium oxide is used as the cathode material. Indium oxide doped in this manner has considerably higher conductivity than the oxides or oxide mixtures hitherto used as cathode materials, especially in the range from 0.1 to 30% by weight of gallium oxide, so that the use of collectors made of precious metals is superfluous. The conductivity may be up to $10^4$ $(\Omega\ cm.)^{-1}$. Gallium oxide may also be wholly or partly replaced by zinc oxide without there being any noticeable change in the conductivity of the mixed oxide.

It is surprising that the oxide electrode material according to the invention can be so anchored in the porous layer of the electrolyte disc that it forms a durable conductive electrode which furthermore cannot be changed either by polarization or by reaction with the solid electrolyte.

The production of an oxide cathode and the electrical properties of the cathode are described in the following example.

EXAMPLE

A solid-electrolyte disc 10 mm. in radius and 1 mm. thick carries a sintered-on porous electrolyte layer with a porosity of approximately 60% by volume. The porous coating is 0.2 mm. thick. The electrolyte material for the electrolyte disc and also for the porous layer is an oxide mixture of 92 mol percent zirconium oxide and 8 mol percent yttrium oxide.

The porous layer is saturated with a highly concentrated indium-nitrate solution containing a corresponding quantity of gallium nitrate, so that an indium oxide containing 0.1% by weight of gallium oxide is produced. The solution is evaporated in the porous matrix until dry, and the mixture of indium nitrate and gallium nitrate is transferred by heating into the oxide mixture. The oxide layer produced is not yet sufficiently dense, so that the resistance of the electrode layer is too high. Saturating the porous layer several times with the nitrate solution and forming the oxide in the porous matrix results in an oxide cathode which, after two hours' continuous heating to 1000° C. air temperature, exhibits sufficiently high conductivity for use as the cathode in a fuel cell. If the porous electrode layer is saturated five times, a square conductivity of a few ohms at room temperature is attained. Since the conductivity increases with a rise in temperature, such a cathode can work without a collector.

Zinc oxide may likewise be used with or instead of gallium oxide for the purpose of doping the indium oxide. The proportion of both foreign oxides in the indium oxide may be between about 0 and 30% by weight.

The drawing depicts the characteristic at 1100° C. of a high-temperature fuel cell with a nickel anode and an indium-oxide cathode doped with gallium oxide without a collector. The fuel was hydrogen, and the oxidant was air. The cell potential in mV. is plotted on the ordinate, and the load on the cell in ma./cm.$^2$ on the abscissa.

We claim:
1. A high temperature fuel cell having an oxygen-ion-conducting solid electrolyte with a porous layer thereon, said porous layer containing indium oxide and at least one other oxide selected from the group consisting of gallium oxide and zinc oxide, and quantity of said at least one other oxide being from 0.1% to not more than 30% by weight of the indium oxide.

2. A fuel cell as claimed in claim 1 wherein the other oxide consists of gallium oxide and zinc oxide.

References Cited

UNITED STATES PATENTS 3,411,947  11/1968  Block et al. _____ 252—518X

FOREIGN PATENTS 977,835  12/1964  Great Britain _____ 136—238
6413003  5/1966  Netherlands _____ 136—120FC

OTHER REFERENCES

Schmitz-Dumont et al., 341 (5–6) Z. Anorg. Allgem. Chem., pp. 252–68, 1965, page 267 relied on.

WINSTON A. DOUGLAS, Primary Examiner

M. J. ANDREWS, Assistant Examiner

U.S. Cl. X.R.

136—120